(12) United States Patent
Wu et al.

(10) Patent No.: US 11,630,626 B2
(45) Date of Patent: Apr. 18, 2023

(54) WIRELESS COMMUNICATIONS PAIRING METHOD AND WIRELESS COMMUNICATIONS PAIRING SYSTEM

(71) Applicants: BenQ Intelligent Technology (Shanghai) Co., Ltd, Shanghai (CN); BENQ CORPORATION, Taipei (TW)

(72) Inventors: Chen-Chi Wu, Taipei (TW); Chin-Fu Chiang, Taipei (TW); Chia-Nan Shih, Taipei (TW); Lin-Yuan You, Taipei (TW); Jung-Kun Tseng, Taipei (TW); Chuang-Wei Wu, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 249 days.

(21) Appl. No.: 17/240,971

(22) Filed: Apr. 26, 2021

(65) Prior Publication Data
US 2021/0334058 A1 Oct. 28, 2021

(30) Foreign Application Priority Data

Apr. 28, 2020 (CN) .......................... 202010352165.0

(51) Int. Cl.
*G06F 3/14* (2006.01)
*G09G 5/00* (2006.01)
*H04W 76/10* (2018.01)

(52) U.S. Cl.
CPC ................. *G06F 3/14* (2013.01); *G09G 5/00* (2013.01); *H04W 76/10* (2018.02); *G09G 2370/16* (2013.01); *G09G 2370/20* (2013.01)

(58) Field of Classification Search
CPC G06F 3/14; H04W 76/10; G09G 5/00; G09G 2370/16; G09G 2370/20
See application file for complete search history.

(56) References Cited

U.S. PATENT DOCUMENTS

2012/0030465 A1* 2/2012 Bailey ................... H04W 76/10
713/168
2013/0067121 A1 3/2013 Beel
2013/0309971 A1 11/2013 Kiukkonen
(Continued)

FOREIGN PATENT DOCUMENTS

| CN | 201207125 Y | 3/2009 |
|---|---|---|
| CN | 103428808 A | 12/2013 |
| CN | 110231924 A | 9/2019 |

*Primary Examiner* — Elton Williams
(74) *Attorney, Agent, or Firm* — Winston Hsu

(57) ABSTRACT

A wireless communications pairing method includes providing a receiver and a first transmitter linked to the receiver, establishing a first link between the first transmitter and a second transmitter, transmitting pairing information from the first transmitter to the second transmitter through the first link, establishing a second link between the second transmitter and the receiver according to the pairing information after the second transmitter receives the pairing information, transmitting an image signal from an image signal source coupled to the second transmitter to the second transmitter after the second transmitter is triggered, processing the image signal by the second transmitter for transmitting the image signal from the second transmitter to the receiver, and controlling a display device for displaying an image by the receiver according to the image signal.

18 Claims, 3 Drawing Sheets

(56) References Cited

U.S. PATENT DOCUMENTS

| | | |
|---|---|---|
| 2014/0040781 A1 | 2/2014 | Epstein |
| 2015/0351143 A1* | 12/2015 | Seymour .............. H04R 25/554 |
| | | 455/41.2 |
| 2016/0378417 A1 | 12/2016 | Kenjalkar |
| 2018/0197501 A1* | 7/2018 | Veeramani ....... H04N 21/43635 |
| 2020/0389622 A1 | 12/2020 | Chiang |
| 2022/0159471 A1* | 5/2022 | Li ........................... H04W 4/80 |

\* cited by examiner

WIRELESS COMMUNICATIONS PAIRING METHOD AND WIRELESS COMMUNICATIONS PAIRING SYSTEM

BACKGROUND OF THE INVENTION

1. Field of the Invention

The present invention illustrates a wireless communications pairing method and a wireless communications pairing system, and more particularly, a wireless communications pairing method and a wireless communications pairing system with high operational convenience.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency.

However, as previously mentioned, in order to perform wireless data communications, a computer requires to be installed with specific software. Then, a pair-wised transmitter and receiver can establish a data link. Particularly, after the specific software is installed in the computer, a risk of data leakage or random hacker attack may be introduced. Further, conventional pairing process for establishing the data link between the transmitter and the receiver may also cause operational inconvenience, as illustrated below.

Currently, when a pairing process for establishing the data link between the transmitter and the receiver is executed, a user must shorten a distance between the transmitter and the receiver. For example, the user can hold the transmitter to approach the receiver. The user can use the button for triggering to transmit or copy link configuration data from the receiver (i.e., such as a wireless network name SSID, an encryption setting, or a password) to the transmitter. Since the transmitter must approach the receiver for performing the pairing process, when the receiver is disposed on a ceiling surface or an unreachable place, it is difficult to perform the pairing process. Therefore, to develop a wireless pairing method having high operation convenience is an important issue.

SUMMARY OF THE INVENTION

In an embodiment of the present invention, a wireless communications pairing method is disclosed. The method comprises providing a receiver and a first transmitter linked to the receiver, establishing a first link between the first transmitter and a second transmitter, transmitting pairing information from the first transmitter to the second transmitter through the first link, establishing a second link between the second transmitter and the receiver according to the pairing information after the second transmitter receives the pairing information, transmitting an image signal from an image signal source coupled to the second transmitter to the second transmitter after the second transmitter is triggered, processing the image signal by the second transmitter for transmitting the image signal from the second transmitter to the receiver, and controlling a display device for displaying an image by the receiver according to the image signal.

In an embodiment of the present invention, a wireless communications pairing system is disclosed. The system comprises a receiver, a first transmitter, and a second transmitter. The first transmitter is coupled to the receiver. The first transmitter comprises a processor and a memory. The processor is configured to process data and to execute a pairing process. The memory is coupled to the processor and configured to save data. The second transmitter is coupled to the first transmitter and configured to pair with the receiver. After a first link between the first transmitter and the second transmitter is established, the processor of the first transmitter transmits pairing information to the second transmitter through the first link. The second link between the second transmitter and the receiver is established according to the pairing information after the second transmitter receives the pairing information. An image signal is transmitted from an image signal source coupled to the second transmitter to the second transmitter after the second transmitter is triggered. The second transmitter processes the image signal for transmitting the image signal from the second transmitter to the receiver. The receiver controls a display device for displaying an image according to the image signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
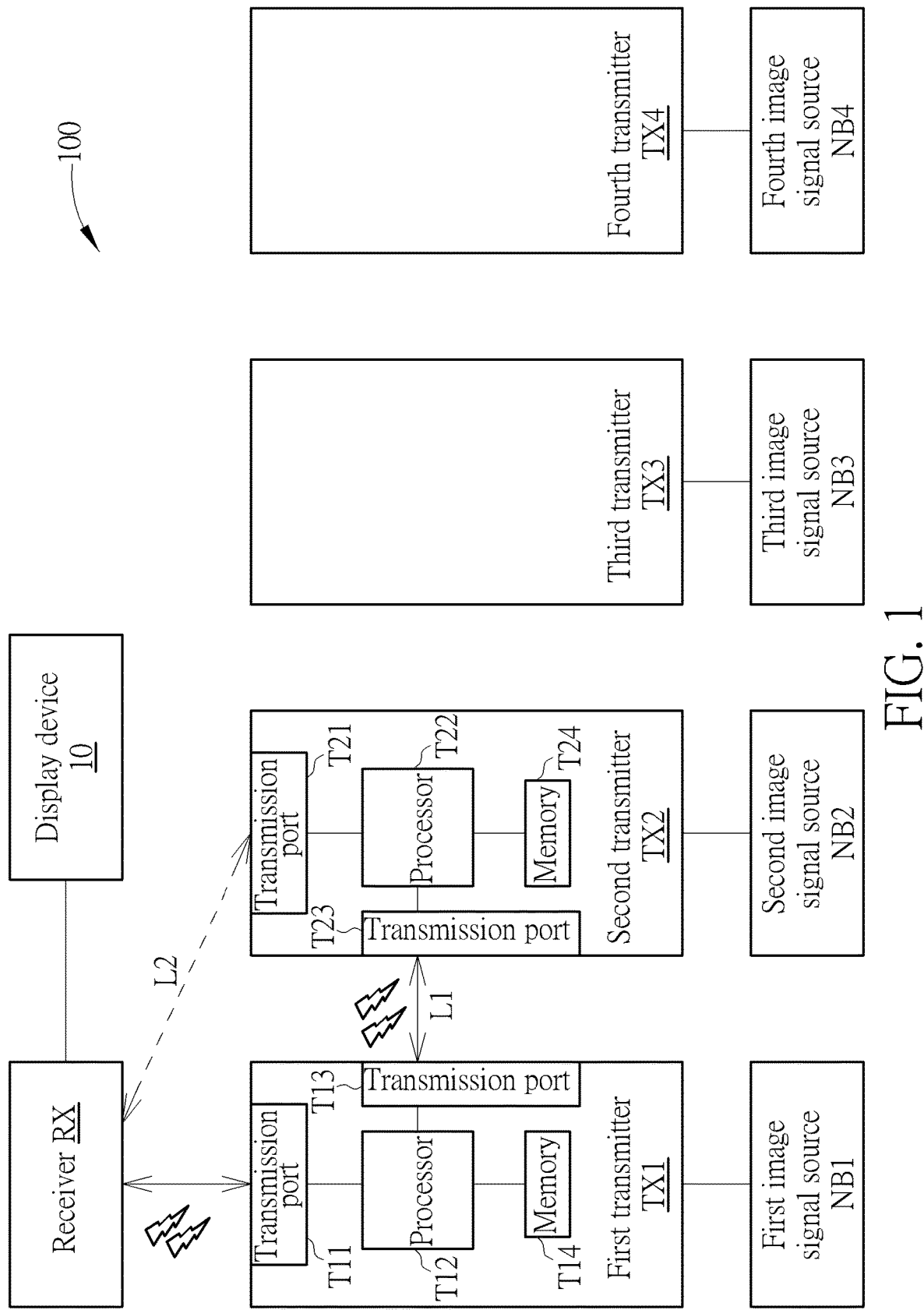
FIG. 1 is a block diagram of a wireless communications pairing system according to an embodiment of the present invention.

FIG. 1 is a block diagram of a wireless communications pairing system 100 according to an embodiment of the present invention. The wireless communications pairing system 100 includes a receiver RX, a first transmitter TX1, and a second transmitter TX2. The receiver RX can be any communication device capable of receiving signals. The receiver RX can establish a link to a display device 10 through a wired or wireless network. The display device 10 can be a liquid crystal display (LCD) device, a projection surface, or a TV wall. The first transmitter TX1 can be coupled to the receiver RX through a cable line. The first transmitter TX1 can be linked to the receiver RX through a wireless network. For example, the first transmitter TX1 can establish the link to the receiver RX by using a Wi-Fi communications protocol. The first transmitter TX1 can include a transmission port T11, a processor T12, a transmission port T13, and a memory T14. The processor T12 can be used for processing signals and executing a pairing process. The memory T14 is coupled to the processor T12 for saving data. The transmission port T11 and the transmission port T13 are coupled to the processor T12 for data transmission. For example, the transmission port T11 can be used for establishing a link to the receiver RX. The transmission port T13 can be used for establishing a link to another transmitter (i.e., a second transmitter TX2). The memory T14 is coupled to the processor T12 for saving data. The memory T14 can be any memory, such as an Electronically-Erasable Programmable Read-Only Memory (EEPROM). The second transmitter TX2 is linked to the first transmitter TX1 for pairing with the receiver RX. The circuit structure of the second transmitter TX2 is similar to the first transmitter TX1. The second transmitter TX2 includes a transmission port T21, a processor T22, a transmission port T23, and a memory T24. Since the circuit structure of the second transmitter TX2 is similar to the first transmitter TX1, details of the second transmitter TX2 are omitted here. Further, the receiver RX of the wireless communications pairing system 100 can simultaneously establish wireless links to a plurality of transmitters. As shown in FIG. 1, the receiver RX can establish wireless links to M transmitters at the same time. M is a positive integer (i.e., M=4 in FIG. 1). In other words, after the first transmitter TX1, the second transmitter TX2, the third transmitter TX3, and the fourth transmitter TX4 establish links to the receiver RX, the first transmitter TX1, the second transmitter TX2, the third transmitter, and the fourth transmitter TX4 can exchange data and access data with the receiver RX. In the wireless communications pairing system 100, the first transmitter TX1, the second transmitter TX2, the third transmitter TX3, and the fourth transmitter TX4 can be coupled to corresponding image data sources. The image data source can be a notebook, a tablet, or a desktop computer. In FIG. 1, the first transmitter TX1 is coupled to a first image data source NB1. The second transmitter TX2 is coupled to a second image data source NB2. The third transmitter TX3 is coupled to a third image data source NB3. The fourth transmitter TX4 is coupled to a fourth image data source NB4. In the wireless communications pairing system 100, after a certain transmitter and the receiver RX are paired for establishing a link, when a new transmitter is introduced, the new transmitter can be paired with the receiver RX by using a relay-based operation method for achieving high operability and high convenience. For example, the first transmitter TX1 and the receiver RX are paired for establishing a link. When the second transmitter TX2 is introduced, the second transmitter TX2 can establish a first link L1 to the first transmitter TX1. After the first link L1 between the first transmitter TX1 and the second transmitter TX2 is established, the processor T12 of the first transmitter TX1 can transmit pairing information to the second transmitter TX2 through the first link L1. A second link L2 between the second transmitter TX2 and the receiver RX can be established according to the pairing information after the second transmitter TX2 receives the pairing information. Then, an image signal can be transmitted from the second image signal source NB2 coupled to the second transmitter TX2 to the second transmitter TX2 after the second transmitter TX2 is triggered. The second transmitter TX2 can process the image signal for transmitting the image signal from the second transmitter TX2 to the receiver RX. Finally, the receiver RX can control the display device 10 for displaying an image according to the image signal.

In FIG. 1, the second link L2 can be a wireless link. The first link L1 can be a wireless link or a wired link. For example, first, the first transmitter TX1 and the second transmitter TX2 can be turned on. Then, the first transmitter TX1 can be triggered for enabling a preconfigured universally unique identifier (UUID) broadcasting mode by using a button. The processor T12 of the first transmitter TX1 can execute a broadcasting process for broadcasting the UUID communication name message within a communication range. Further, the second transmitter TX2 can be configured under a discovery mode. The second transmitter TX2 can look for a special UUID string by using the discovery mode for performing the pairing process. As previously mentioned, after the receiver RX is linked to the first transmitter TX1, the pairing information can be saved in the memory T14 of the first transmitter TX1. Therefore, after the second transmitter TX2 looks for the first transmitter TX1 and establishes the first link L1, the processor T12 of the first transmitter TX1 can read the pairing information from the memory T14 for transmitting the pairing information from the first transmitter TX1 to the second transmitter TX2 through the first link L1. Therefore, the second transmitter TX2 can establish the second link L2 to the receiver RX according to the pairing information. The aforementioned communication method of the first link L1 between the first transmitter TX1 and the second transmitter TX2 can be a wireless (non-contact) communication method, such as a wireless communication method of a Bluetooth protocol.

Further, the communication method of the first link L1 between the first transmitter TX1 and the second transmitter TX2 can be performed by using a Near Field Communication (NFC) protocol, as illustrated below. After the receiver RX is linked to the first transmitter TX1 (i.e., the pairing process is completed), the pairing information can be saved in the memory T14 of the first transmitter TX1. The memory T14 can be an EEPROM for saving NFC data. After the second transmitter TX2 is coupled to a power supply and is enabled, a button can be used for turning on an NFC data reading function. When the second transmitter TX2 is enabled within the communication coverage of the first transmitter TX1, the pairing process can be triggered. The processor T12 of the first transmitter TX1 can read the pairing information saved in the memory T14, and then transmit the pairing information to the second transmitter TX2 through the first link L1. The processor T22 of the second transmitter TX2 can write the pairing information into the memory T24 (such as EEPROM). The processor T12 of the first transmitter TX1 can also read identification information of the second transmitter TX2, such as a hardware identification code, a network name, and/or a serial number. Then, the first transmitter TX1 can transmit the identification information of the second transmitter TX2 to the receiver RX. Accordingly, the receiver RX can add the second transmitter TX2 to a valid verification list. Here, since the second transmitter TX2 is listed in the valid verification list of the receiver RX, the second transmitter TX2 has an authority for establishing a second link L2 to the receiver RX. Then, the second transmitter TX2 can be restarted. Then, the processor T22 of the second transmitter TX2 can read the pairing information in the memory T24 for establishing the second link L2 to the receiver RX based on the pairing information.

Further, the communication method of the first link L1 between the first transmitter TX1 and the second transmitter TX2 can be performed by using a wired data transmission, as illustrated below. The pairing information is saved in the memory T14 of the first transmitter TX1 after the receiver RX is linked to the first transmitter TX1. The second transmitter TX2 can be linked to the first transmitter TX1 by using a hot-plug connector. However, the first transmitter TX1 and the second transmitter TX2 can use any wired communication technology for exchanging data. Any reasonable hardware modification falls into the scope of the present invention. After the pairing process of the second transmitter TX2 is triggered, the first transmitter TX1 can perform a monitoring process (i.e., such as USB Monitor Program) for identifying communication protocol information (i.e., such as human interface, HID information) of the second transmitter TX2 and enable the pairing process of the first transmitter TX1. Then, the first transmitter TX1 and the second transmitter TX2 can exchange data information. After the pairing information saved in the memory T14 of the first transmitter TX1 is transmitted to the second transmitter TX2 through the first link L1, the second transmitter TX2 can duplicate the pairing information to the memory T24. Therefore, the second transmitter TX2 can establish the second link L2 to the receiver RX according to the pairing information.

Specifically, in order to enhance network security and prevent a second link L2 from being established between an unlicensed transmitter and the receiver RX, the second transmitter TX2 must transmit the identification information to the receiver RX through the first transmitter TX1 before the second link L2 between the second transmitter TX2 and the receiver RX is established. Accordingly, the receiver RX can add the second transmitter TX2 into the valid verification list. After the second transmitter TX2 is linked to the power supply and then successfully establishes the second link L2 to the receiver RX, the second transmitter TX2 can transmit the image signal to the receiver RX. The receiver RX can control the display device 10 for displaying the image according to the image signal transmitted from the second transmitter TX2.

In FIG. 1, the receiver RX can also introduce a pairing list for selectively establishing a link to a specific transmitter. To avoid ambiguity, a third transmitter TX3 and a fourth transmitter TX4 can be introduced to the wireless communications pairing system 100, as illustrated below. Here, the receiver RX saves a pairing list, such as a specific member list of the email, or a meeting member list manually set by the user. After the third transmitter TX3 is linked to the first transmitter TX1, the third transmitter TX3 transmits a registration message to the receiver RX through the first transmitter TX1. The receiver RX determines if the third transmitter TX3 is listed in the pairing list according to the registration message. When the third transmitter TX3 is absent in the pairing list, a link between the receiver RX and the third transmitter TX3 is inhibited by the receiver RX. Similarly, after a fourth transmitter TX4 is linked to the first transmitter TX1, the fourth transmitter TX4 transmits a registration message to the receiver RX through the first transmitter TX1. The receiver RX establishes a link between the receiver RX and the fourth transmitter TX4 when the fourth transmitter TX4 is listed in the pairing list.

In other words, the first transmitter TX1 can be regarded as a relay node. The first transmitter TX1 is capable of relaying the pairing information to other transmitters. Therefore, transmitters having the pairing information can extract link configuration information for establishing links to the receiver RX. Further, in the wireless communications pairing system 100, each transmitter can be regarded as a virtual display device. For example, when the second transmitter TX2 is coupled to the second image signal source NB2, the second transmitter TX2 transmits extended display identification data (EDID) to a data processing device of the second image signal source NB2 (i.e., such as a central processing unit or graphics card in a computer). Further, after the data processing device receives the EDID, the second image signal source NB2 can identify the second transmitter TX2 as the virtual display device according to the EDID. After the second transmitter TX2 is identified as the virtual display device, the second transmitter TX2 can acquire the image signal and then transmit the image signal to the receiver RX. The receiver RX can control the display device 10 for displaying images according to the second image signal source NB2.

Figure 2A:
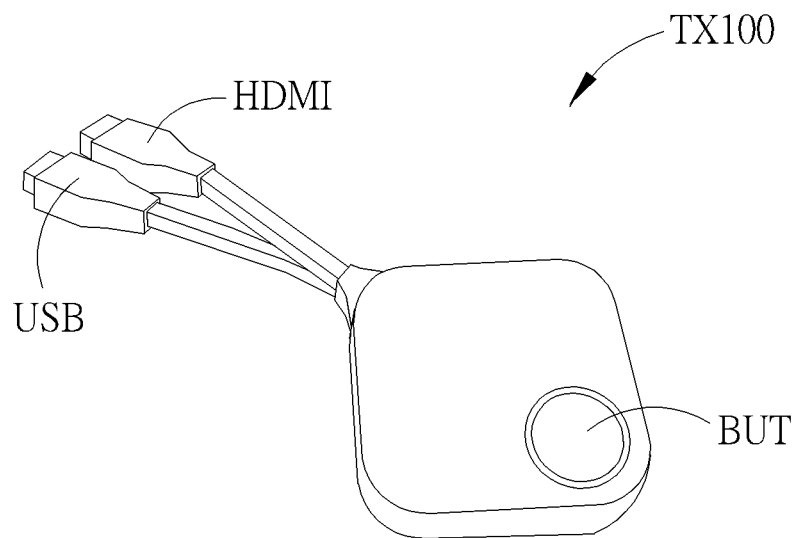
FIG. 2A is an illustration of a first appearance of a transmitter in the wireless communications pairing system in FIG. 1.
Figure 2B:
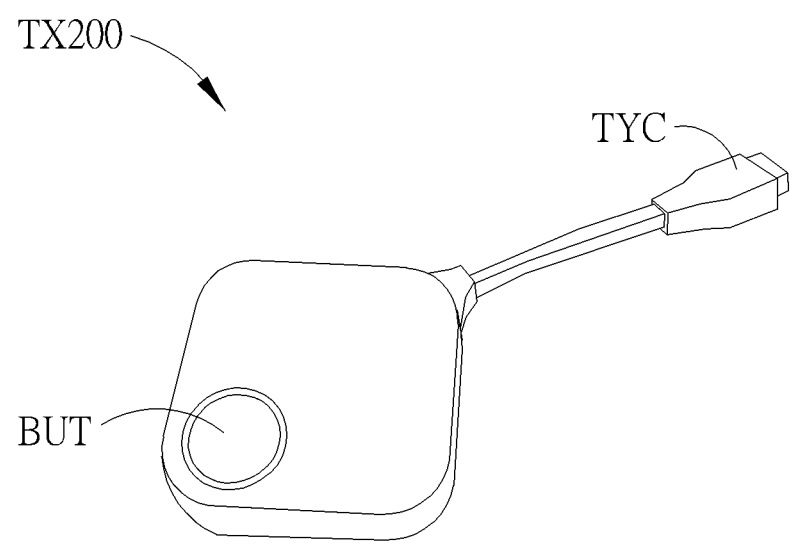
FIG. 2B is an illustration of a second appearance of the transmitter in the wireless communications pairing system in FIG. 1.
Figure 3:
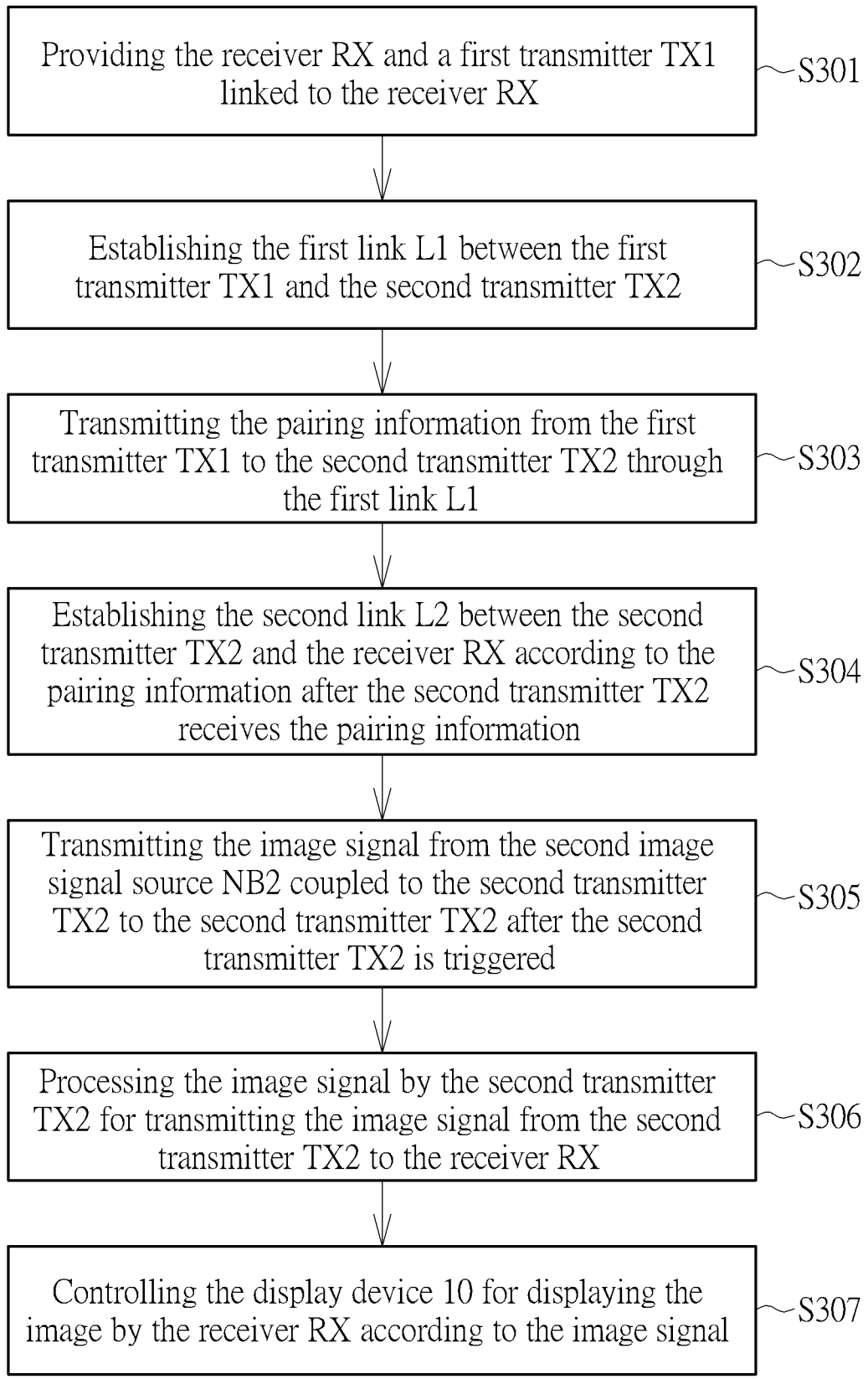
FIG. 3 is a flow chart of performing a wireless communications pairing method by using the wireless communications pairing system in FIG. 1.

FIG. 2A is an illustration of a first appearance of a transmitter in the wireless communications pairing system 100. FIG. 2B is an illustration of a second appearance of the transmitter in the wireless communications pairing system 100. To avoid ambiguity, the transmitter in FIG. 2A is denoted as a transmitter TX100 hereafter. The transmitter in FIG. 2B is denoted as a transmitter TX200 hereafter. As shown in FIG. 2 and FIG. 3, the transmission device TX100 and the transmission device TX200 have buttons BUT. The button BUT can also be regarded as a control button for triggering to transmit the image signal to the receiver RX. For example, after the transmitter TX100 is paired with the receiver RX for establishing a link, when the user presses the button BUT, the transmitter TX100 can transmit the image signal to the receiver RX. The receiver RX can control the display device 10 for displaying images according to the image signal. Further, as previously mentioned, the transmitter can be linked to a corresponding image signal source (i.e., such as a notebook). Therefore, the transmitter can include at least one data transmission port. For example, the transmitter TX100 can use the USB Type-A transmission port USB and/or the High Definition Multimedia Interface (HDMI) transmission port HDMI for linking to the corresponding image signal source. Further, the transmitter TX200 can be linked to the corresponding image signal source by using a C-type universal serial bus (USB Type-C) transmission port TYC. However, embodiments of the present invention are not limited to signal formats. Any reasonable hardware modification such as a cable length, a transmission port specification, or a device appearance design falls into the scope of the present invention.

FIG. 3 is a flow chart of performing a wireless communications pairing method by using the wireless communications pairing system 100. The pairing method includes step S301 to step S307. Step S301 to step S307 are illustrated below.

Step S301: providing the receiver RX and a first transmitter TX1 linked to the receiver RX;

Step S302: establishing the first link L1 between the first transmitter TX1 and the second transmitter TX2;

Step S303: transmitting the pairing information from the first transmitter TX1 to the second transmitter TX2 through the first link L1;

Step S304: establishing the second link L2 between the second transmitter TX2 and the receiver RX according to the pairing information after the second transmitter TX2 receives the pairing information;

Step S305: transmitting the image signal from the second image signal source NB2 coupled to the second transmitter TX2 to the second transmitter TX2 after the second transmitter TX2 is triggered;

Step S306: processing the image signal by the second transmitter TX2 for transmitting the image signal from the second transmitter TX2 to the receiver RX;

Step S307: controlling the display device 10 for displaying the image by the receiver RX according to the image signal.

Details of step S301 to step S307 are previously illustrated. Thus, they are omitted here. In the wireless communications pairing system 100, the first transmitter TX1 can be regarded as a relay node for transmitting the pairing information to the second transmitter TX2. Therefore, for the second transmitter TX2, the second transmitter TX2 can acquire settings and parameters of establishing the link between the second transmitter TX2 and the receiver RX through the first transmitter TX1. In other words, the second transmitter TX2 can complete the pairing process and further establish the link to the receiver without approaching the receiver RX.

To sum up, the present invention discloses a wireless communications pairing method and a wireless communications pairing system. When a position of the receiver is difficult to reach, instead of executing a pairing process by approaching a new transmitter to the receiver, a "paired" transmitter can be regarded as a relay node for transmitting the pairing information from the receiver to the new transmitter through the "paired" transmitter. In other words, the new transmitter can acquire the pairing information (i.e., such as settings and parameters) of establishing the link to the receiver. Therefore, the new transmitter can complete the pairing process and further establish the link to the receiver without approaching the new transmitter to the receiver. Since the wireless communications pairing system is capable of relaying the pairing information, operability and convenience of establishing a wireless link between the new transmitter and the receiver can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communications pairing method comprising:
   providing a receiver and a first transmitter linked to the receiver;
   establishing a first link between the first transmitter and a second transmitter;
   transmitting pairing information from the first transmitter to the second transmitter through the first link;
   establishing a second link between the second transmitter and the receiver according to the pairing information after the second transmitter receives the pairing information;
   transmitting an image signal from an image signal source coupled to the second transmitter to the second transmitter after the second transmitter is triggered;
   transmitting extended display identification data (EDID) from the second transmitter to a data processing device of the image signal source when the second transmitter is coupled to the image signal source;
   identifying the second transmitter as a virtual display device by the data processing device according to the EDID after the data processing device receives the EDID;
   processing the image signal by the second transmitter for transmitting the image signal from the second transmitter to the receiver; and
   controlling a display device for displaying an image by the receiver according to the image signal.

2. The method of claim 1, wherein the second link is a wireless link, and the first link is a wireless link or a wired link.

3. The method of claim 1, further comprising:
   saving the pairing information in a memory of the first transmitter after the receiver is linked to the first transmitter;
   triggering a pairing process when the second transmitter is enabled within a communication coverage of the first transmitter; and
   reading the pairing information from the memory by the first transmitter for transmitting the pairing information from the first transmitter to the second transmitter through the first link.

4. The method of claim 1, further comprising:
   saving the pairing information in a memory of the first transmitter after the receiver is linked to the first transmitter;
   executing a broadcasting process by the first transmitter for broadcasting the pairing information within a communication coverage;
   searching a communication identifier message of the first transmitter by using a searching process of the second transmitter when the second transmitter is enabled within a communication coverage of the first transmitter; and
   reading the pairing information from the memory by the first transmitter for transmitting the pairing information from the first transmitter to the second transmitter through the first link after the first transmitter is identified by the second transmitter for establishing the first link.

5. The method of claim 1, further comprising:
   saving the pairing information in a memory of the first transmitter after the receiver is linked to the first transmitter;
   using a hot-plug connector for linking the second transmitter to the first transmitter;
   triggering a pairing process of the second transmitter;
   performing a monitoring process for identifying communication protocol information of the second transmitter by the first transmitter;
   enabling a pairing process of the first transmitter; and
   duplicating the pairing information saved in the memory of the first transmitter to the second transmitter through the first link.

6. The method of claim 1, further comprising:
   generating a pairing list to the receiver;
   transmitting a registration message from a third transmitter to the receiver through the first transmitter;
   the receiver determining if the third transmitter is listed in the pairing list according to the registration message; and
   inhibiting the receiver from establishing a link between the receiver and the third transmitter when the third transmitter is absent in the pairing list.

7. The method of claim 1, further comprising:
   generating a pairing list to the receiver;

transmitting a registration message from a fourth transmitter to the receiver through the first transmitter;

the receiver determining if the fourth transmitter is listed in the pairing list according to the registration message; and establishing a link between the receiver and the fourth transmitter when the fourth transmitter is listed in the pairing list.

8. The method of claim 1, further comprising:

reading identification information of the second transmitter by the first transmitter;

transmitting the identification information from the first transmitter to the receiver; and adding the second transmitter to a valid verification list by the receiver for establishing the second link between the second transmitter and the receiver.

9. The method of claim 1, further comprising:

transmitting identification information of the second transmitter to the receiver through the first transmitter before the second link between the second transmitter and the receiver is established;

adding the second transmitter to a valid verification list by the receiver; and transmitting the image signal from the second transmitter to the receiver after the transmitter is linked to the power supply and successfully establishes the second link the receiver.

10. A wireless communications pairing system comprising:

a receiver;

a first transmitter coupled to the receiver, the first transmitter comprising:
  a processor configured to process data and execute a pairing process; and
  a memory coupled to the processor and configured to save data; and a second transmitter coupled to the first transmitter and configured to pair with the receiver;

wherein after a first link between the first transmitter and the second transmitter is established, the processor of the first transmitter transmits pairing information to the second transmitter through the first link, a second link between the second transmitter and the receiver is established according to the pairing information after the second transmitter receives the pairing information, an image signal is transmitted from an image signal source coupled to the second transmitter to the second transmitter after the second transmitter is triggered, the second transmitter transmits extended display identification data (EDID) to a data processing device of the image signal source when the second transmitter is coupled to the image signal source, and the image signal source identifies the second transmitter as a virtual display device according to the EDID after the data processing device receives the EDID, the second transmitter processes the image signal for transmitting the image signal from the second transmitter to the receiver, and the receiver controls a display device for displaying an image according to the image signal.

11. The system of claim 10, wherein the second link is a wireless link, and the first link is a wireless link or a wired link.

12. The system of claim 10, wherein the pairing information is saved in a memory of the first transmitter after the receiver is linked to the first transmitter, a pairing process is triggered when the second transmitter is enabled within a communication coverage of the first transmitter, and the first transmitter reads the pairing information from the memory for transmitting the pairing information from the first transmitter to the second transmitter through the first link.

13. The system of claim 10, wherein the pairing information is saved in a memory of the first transmitter after the receiver is linked to the first transmitter, the first transmitter executes a broadcasting process for broadcasting the pairing information within a communication coverage, the second transmitter executes a searching process for searching a communication identifier message of the first transmitter when the second transmitter is enabled within a communication coverage of the first transmitter, and the processor of the first transmitter reads the pairing information from the memory for transmitting the pairing information from the first transmitter to the second transmitter through the first link.

14. The system of claim 10, wherein the pairing information is saved in a memory of the first transmitter after the receiver is linked to the first transmitter, the second transmitter is linked to the first transmitter by using a hot-plug connector, the first transmitter performs a monitoring process for identifying communication protocol information of the second transmitter and enables a pairing process after a pairing process of the second transmitter is triggered, and the second transmitter duplicates the pairing information saved in the memory of the first transmitter through the first link.

15. The system of claim 10, further comprising:

a third transmitter linked to the first transmitter;

wherein the receiver saves a pairing list, the third transmitter transmits a registration message to the receiver through the first transmitter, the receiver determines if the third transmitter is listed in the pairing list according to the registration message, and a link between the receiver and the third transmitter is inhibited by the receiver when the third transmitter is absent in the pairing list.

16. The system of claim 10, further comprising:

a fourth transmitter linked to the first transmitter;

wherein the receiver saves a pairing list, the fourth transmitter transmits a registration message to the receiver through the first transmitter, the receiver determines if the fourth transmitter is listed in the pairing list according to the registration message, and the receiver establishes a link between the receiver and the fourth transmitter when the fourth transmitter is listed in the pairing list.

17. The system of claim 10, wherein the first transmitter reads identification information of the second transmitter, the first transmitter transmits the identification information to the receiver, and the receiver adds the second transmitter to a valid verification list for establishing the second link between the second transmitter and the receiver.

18. The system of claim 10, wherein identification information of the second transmitter is transmitted to the receiver through the first transmitter before the second link between the second transmitter and the receiver is established, the receiver adds the second transmitter to a valid verification list, and the second transmitter transmits the image signal to the receiver after the transmitter is linked to the power supply and successfully establishes the second link the receiver.

* * * * *